(12) United States Patent
Ellman et al.

(10) Patent No.: US 7,363,330 B1
(45) Date of Patent: Apr. 22, 2008

(54) WORK MONITOR WITH FILE SYNCHRONIZATION

(75) Inventors: Nancy Ellman, Huntington, NY (US); John Bonamico, Mattituck, NY (US)

(73) Assignee: Symantec Corporation, Cupertino, CA (US)

( * ) Notice: Subject to any disclaimer, the term of this patent is extended or adjusted under 35 U.S.C. 154(b) by 0 days.

(21) Appl. No.: 09/327,766

(22) Filed: Jun. 7, 1999

(51) Int. Cl.
    *G06F 17/30* (2006.01)
(52) U.S. Cl. .................. 707/204; 707/10; 707/201; 707/203; 707/205
(58) Field of Classification Search ............. 707/10, 707/201, 202, 203, 200, 204, 205; 709/227, 709/213; 340/825.44, 7.21; 395/157; 710/5; 711/161
    See application file for complete search history.

(56) References Cited

U.S. PATENT DOCUMENTS

| | | | | |
|---|---|---|---|---|
| 5,345,551 A | * | 9/1994 | Shelley et al. | 395/157 |
| 5,600,834 A | | 2/1997 | Howard | 395/617 |
| 5,684,990 A | * | 11/1997 | Boothby | 707/203 |
| 5,729,735 A | * | 3/1998 | Meyering | 707/10 |
| 5,745,753 A | * | 4/1998 | Mosher, Jr. | 707/202 |
| 5,794,252 A | * | 8/1998 | Bailey et al. | 707/202 |
| 5,835,915 A | * | 11/1998 | Carr et al. | 707/202 |

(Continued)

FOREIGN PATENT DOCUMENTS

EP          0280773 A    7/1988

(Continued)

OTHER PUBLICATIONS

Bernadette Houghton, "Symantec pcTelecommute," PC Update, Dec. 1998, Melbourne, Australia reprinted on-line at URL: http://www.melbpc.org.au/pcupdate/9812/9812article6.htm.

(Continued)

*Primary Examiner*—Thuy N. Pardo
(74) *Attorney, Agent, or Firm*—Gunnison, McKay & Hodgson, L.L.P.

(57) ABSTRACT

When the user works at home on his home computer, a work monitor logs his file activities on all the drives of his home computer in a work monitor log, which can be displayed in a work monitor window. The user can choose to update from the work monitor window. When update is selected, the files in the work monitor log are selected for file synchronization. When file synchronization is performed, files on the user's home computer are synchronized with corresponding files on the user's office computer. Preferably, the date and time of a file on the home computer selected for file synchronization are compared to the corresponding date and time of the corresponding file on the office computer to determine the direction of file synchronization. The newer version of the file overwrites the older version of the file on either the home or office computer. The file activities which qualify for logging in the work monitor log are selectable by the user as either accesses to the file, for example, reading a file without necessarily writing over it, or as file modification, which requires that the user writes the file. The generation of the work monitor log involves logging each file activity when the work monitor is enabled by the user. The user may wish to disable the work monitor for periods of time for various reasons. The user may select a variable time period for which log entries are maintained in the work monitor log, for example one week. Work monitor log entries are deleted from the work monitor after they have been in the work monitor log for more than the variable time period.

10 Claims, 8 Drawing Sheets

U.S. PATENT DOCUMENTS

| | | | |
|---|---|---|---|
| 5,928,329 A * | 7/1999 | Clark et al. | 709/227 |
| 6,034,621 A * | 3/2000 | Kaufman | 340/825.44 |
| 6,226,650 B1 * | 5/2001 | Mahajan et al. | 707/201 |
| 6,233,606 B1 * | 5/2001 | Dujari | 709/213 |
| 6,317,797 B2 * | 11/2001 | Clark et al. | 710/5 |
| 6,341,291 B1 * | 1/2002 | Bentley et al. | 707/203 |
| 6,397,307 B2 * | 5/2002 | Ohran | 711/161 |
| 6,401,093 B1 * | 6/2002 | Anand et al. | 707/10 |
| 6,732,111 B2 * | 5/2004 | Brodersen et al. | 707/101 |
| 2007/0033265 A1 * | 2/2007 | Anderson et al. | 709/217 |

FOREIGN PATENT DOCUMENTS

EP        0794646 A     10/1997

OTHER PUBLICATIONS

Symantec France Press Release, "Symantec Annonce la Première Solution de Productivité pour les Télétravailleurs," Oct. 15, 1998, Paris, France URL: http://www.symantec.com/region/fr/press/n981117a.fr.html.

* cited by examiner

| Type | Date | Time | Name | Phone Number | Duration | Status | Subject |
|---|---|---|---|---|---|---|---|
| Phone | 6/19/98 | 10:53 AM | John Adams | 1 (516) 4652468 | 0:03:30 | Outgoing | |
| Phone | 6/19/98 | 10:52 AM | <unknown> | <unknown> | | Incoming | |
| File | 6/19/98 | 10:52 AM | D:\data\docs\External\Ma... | | | Modified | |
| File | 6/19/98 | 10:19 AM | D:\data\docs\Habitat ISD... | | | Modified | |
| Fax | 6/19/98 | 10:15 AM | JOHN ADAMS | 1 (516) 4652443 | | Outgoing | TEST |
| File | 6/19/98 | 10:13 AM | D:\data\docs\External\TE... | | | Modified | |

WORK MONITOR WITH FILE SYNCHRONIZATION

BACKGROUND OF THE INVENTION

1. Field of the Invention

The present invention pertains to the field of telecommuting with remote personal computers to access a network file system. Specifically, the present invention pertains to the field of synchronization of local copies of network files on a remote personal computer with the network files on the network file system.

2. Discussion of the Related Art

If the user creates a file on his office PC and modifies it when he gets home, the user must be certain that the file on his office PC is updated with his changes. Keeping files "in sync" ensures that both files are identical and helps prevent loss of data and time.

Conventionally, the computer user having separate home and office personal computers must tediously remember to copy the files upon which he plans to work or needs access to from the office computer to the home computer before working at home and to copy the latest version of the files from his home computer to his office computer after working at home.

A need exists for automating the process of synchronizing home and office computer files without relying upon the computer user's memory of what files he needs or has modified.

SUMMARY OF THE INVENTION

Conventionally, the computer user having separate home and office personal computers must tediously remember to copy the files upon which he plans to work or needs access to from the office computer to the home computer before working at home and to copy the latest version of the files from his home computer to his office computer after working at home.

According to the present invention, when the user works at home on his home computer, a work monitor logs his file activities on all the drives of his home computer in a work monitor log, which can be displayed in a work monitor window. The user can choose to update from the work monitor window. When update is selected, the files in the work monitor log are selected for file synchronization. When file synchronization is performed, files on the user's home computer are synchronized with corresponding files on the user's office computer. Preferably, only files corresponding to file activity during the current day are automatically selected for synchronization in response to the user choosing update from the work monitor window. Preferably, the same path and file name are synchronized on the user's home and office computers, although the user can specify that a file and path name on the home computer corresponds to a different file and path name on the office computer. Preferably, the date and time of a file on the home computer selected for file synchronization are compared to the corresponding date and time of the corresponding file on the office computer to determine the direction of file synchronization. If the version of the file on the home computer is younger than the version of the file on the office computer, then the version on the home computer is written over the version on the office computer. If the version on the office computer is younger than the version on the home computer, then the version on the office computer is written over the version on the home computer.

The file activities which qualify for logging in the work monitor log are selectable by the user as either accesses to the file, for example, reading a file without necessarily writing over it, or as file modification, which requires that the user writes the file. The generation of the work monitor log involves logging each file activity when the work monitor is enabled by the user. The user may wish to disable the work monitor for periods of time for various reasons. The user may select a variable time period for which log entries are maintained in the work monitor log, for example one week. Work monitor log entries are deleted from the work monitor after they have been in the work monitor log for more than the variable time period.

These and other features and advantages of the present invention are described in the Detailed Description of the Invention in conjunction with the Figures.

BRIEF DESCRIPTION OF THE DRAWINGS

The Figures are thoroughly explained in the context of the invention in the following Detailed Description of the Invention.

DETAILED DESCRIPTION OF THE INVENTION

Conventionally, the computer user having separate home and office personal computers must tediously remember to copy the files upon which he plans to work or needs access to from the office computer to the home computer before working at home and to copy the latest version of the files from his home computer to his office computer after working at home.

If the user creates a file on his office PC and modifies it when he gets home, the user must be certain that the file on his office PC is updated with his changes. Keeping files "in sync" ensures that both files are identical and helps prevent loss of data and time. pcTELECOMMUTE™ (pcTELE-COMMUTE is a registered trademark of Symantec Corporation) synchronizes files so that the most recent version is on both his home and office PCs.

Using pcTELECOMMUTE, the user can quickly create a list of files that the user wants to synchronize, and synchronize them all in a single step. pcTELECOMMUTE maintains this list of file synchronizations so that the user can perform them again and again. If the user starts his workday at home by synchronizing his files, the user can be sure that he is working on the most recent version of the file—regardless of whether it was last changed at home or in the office.

If the user modifies a file at home and forgets to synchronize it with his office PC, the pcTELECOMMUTE DayEnd Sync™ (DayEnd Sync is a registered trademark of Symantec Corporation) feature will remind the user to synchronize his files at the end of his workday.

Figure 1:
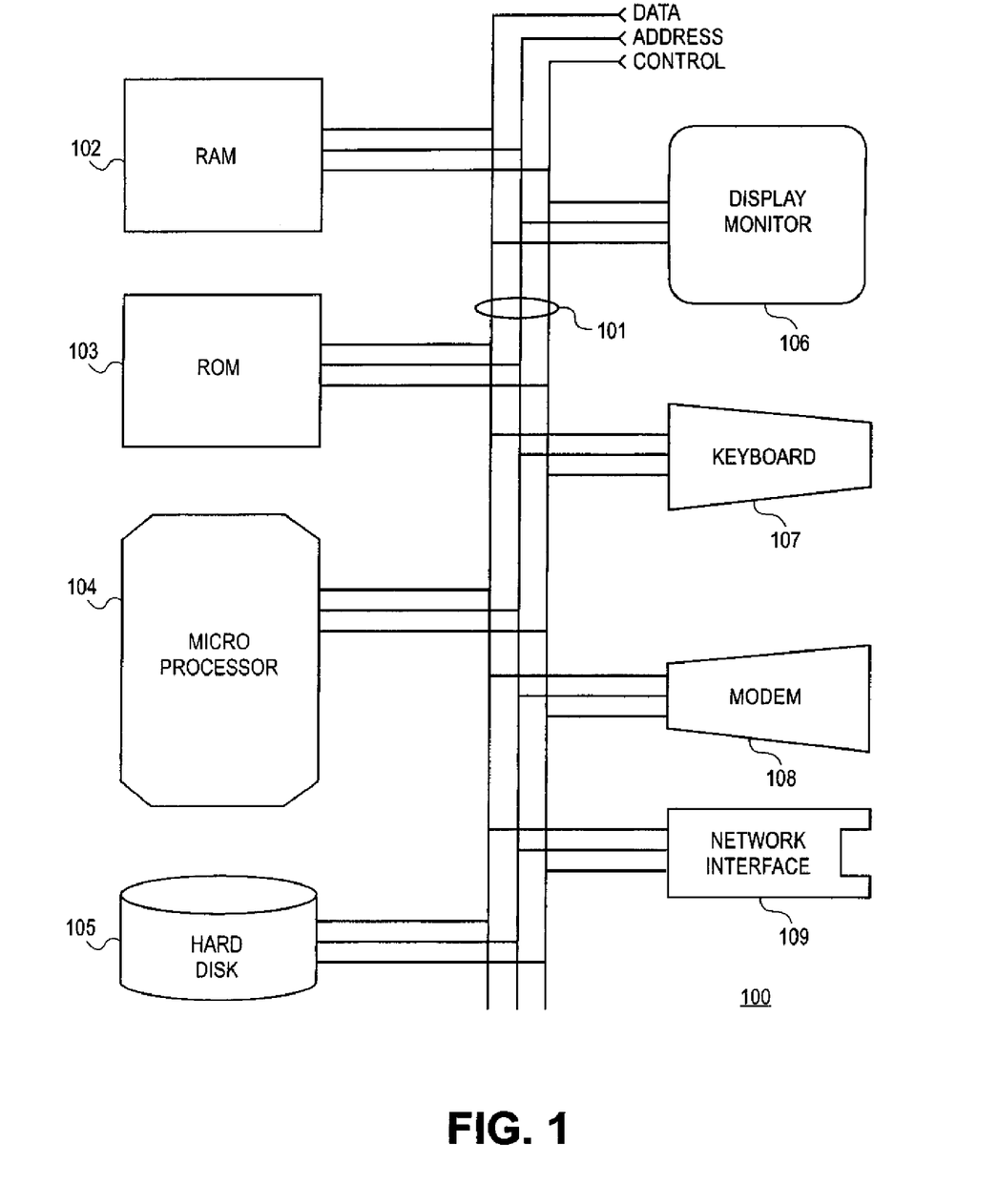
FIG. 1 illustrates a general purpose computer system suitable for implementing the methods according to the present invention.

FIG. 1 illustrates a general purpose computer system 100 suitable for implementing the methods according to the present invention. The general purpose computer system 100 includes at least a microprocessor 104. The general purpose computer may also include random access memory 102, ROM memory 103, a keyboard 107, and a modem 108. All of the elements of the general purpose computer 100 are optionally tied together by a common bus 101 for transporting data between the various elements. The bus 101 typically includes data, address, and control signals. Although the general purpose computer 100 illustrated in FIG. 1 includes a single data bus 101 which ties together all of the elements of the general purpose computer 100, there is no requirement that there be a single communication bus 101 which connects the various elements of the general purpose computer 100. For example, the microprocessor 104, RAM 102, and ROM 103, are alternatively tied together with a data bus while the hard disk 105, modem 108, keyboard 107, display monitor 106, and network interface 109 are connected together with a second data bus (not shown). In this case, the first data bus 101 and the second data bus (not shown) are linked by a bidirectional bus interface (not shown). Alternatively, some of the elements, such as the microprocessor 102 and RAM 102 are connected to both the first data bus 101 and the second data bus (not shown), and communication between the first and second data bus occurs through the microprocessor 102 and RAM 102. The network interface 109 provides communication capability to a local area network LAN using an ethernet connection, for example. The modem 108 allows the computer 100 to communicate through the telephone system. The methods of the present invention are executable on any general purpose computer system such as the 100 illustrated in FIG. 1, but there is clearly no limitation that this computer system is the only one which can execute the methods of the present invention.

Tracking the Workday

The pcTELECOMMUTE Work Monitor keeps track of the work the user does on his home PC including files the user creates, modifies, or accesses; calls the user makes and receives; and faxes the user sends and receives. The user specifies the kinds of files and activities the user wants pcTELECOMMUTE to monitor and how long the user wants the activities to remain in the Work Monitor log. If the user needs to report on the time the user spends working at home, he can print a status report from the Work Monitor.

Upon installing pcTELECOMMUTE on his home PC, the user can choose to set up his home connection, telephone, fax, file synchronization, and Work Monitor, or the user can enter or change this information later after installation.

Setting Up File Synchronization:

In the first panel of the File Sync Setup Wizard, the user can specify if they want to automatically send files to a folder and enter the path for the folder or if the user wants to select a folder each time the user transfers files. Thus, the user selects to automatically send files to a specified folder on the office PC, or selects to manually designate a unique folder for each file transfer and update procedure. Manually designating the folder the user wants is the default choice.

In the second panel of the File Sync Setup Wizard, the user can specify if they want to verify before overwriting a file and if the user wants pcTELECOMMUTE to check for viruses on transferred files. Thus, the user selects to see a warning before overwriting a file if the user wants to confirm overwriting a duplicate file on the office PC. The user unchecks this option to have pcTELECOMMUTE check the date and time on the file and automatically overwrite older files only.

Figure 2:
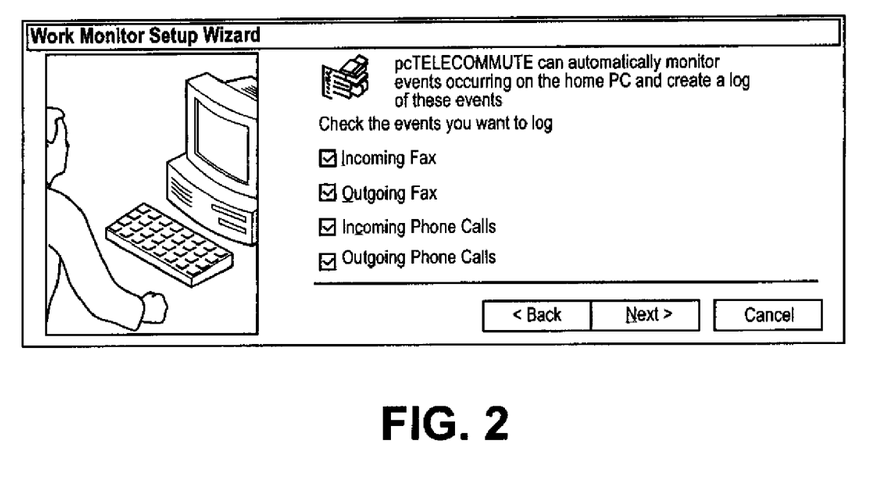
FIG. 2 illustrates the first panel of the Work Monitor Setup Wizard, in which the user specifies if the user wants to log incoming and outgoing faxes and incoming and outgoing phone calls.

Setting Up the Work Monitor:

In the first panel of the Work Monitor Setup Wizard, the user can specify if they want to log incoming and outgoing faxes and incoming and outgoing phone calls. FIG. 2 illustrates the first panel of the Work Monitor Setup Wizard, in which the user specifies if the user wants to log incoming and outgoing faxes and incoming and outgoing phone calls.

Figure 3:
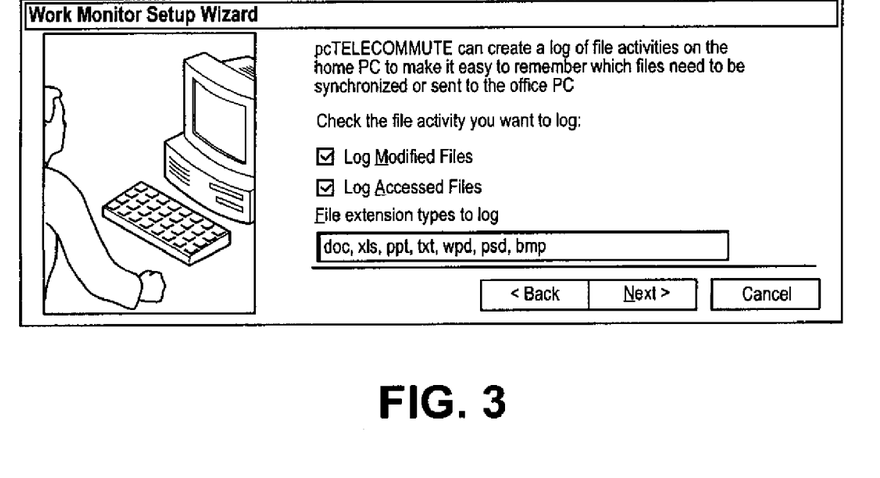
FIG. 3 illustrates the second panel of the Work Monitor Setup Wizard, in which the user selects whether or not to monitor accessed or monitored files.

In the second panel of the Work Monitor Setup Wizard, the user can specify if they want to monitor modified files or accessed files. FIG. 3 illustrates the second panel of the Work Monitor Setup Wizard, in which the user selects whether or not to monitor accessed or modified files. The user can select Log Modified Files if the user wants pcTELECOMMUTE to monitor files the user creates or modifies on his home PC. The user can select Log Accessed Files if the user wants pcTELECOMMUTE to monitor files the user accesses or reads, even if the user does not modify the files. In the File Extension Types To Log field, the user can enter the filename extensions that the user wants pcTELECOMMUTE to monitor. The field already contains the filename extensions of several popular Windows applications. If the user wants pcTELECOMMUTE to monitor other file types, the user enters the filename extensions (without a period) in the field. The user must be sure to separate extensions with a comma. The user can also delete any extension listed in the field if the user does not want to monitor it on his home PC.

Figure 4:
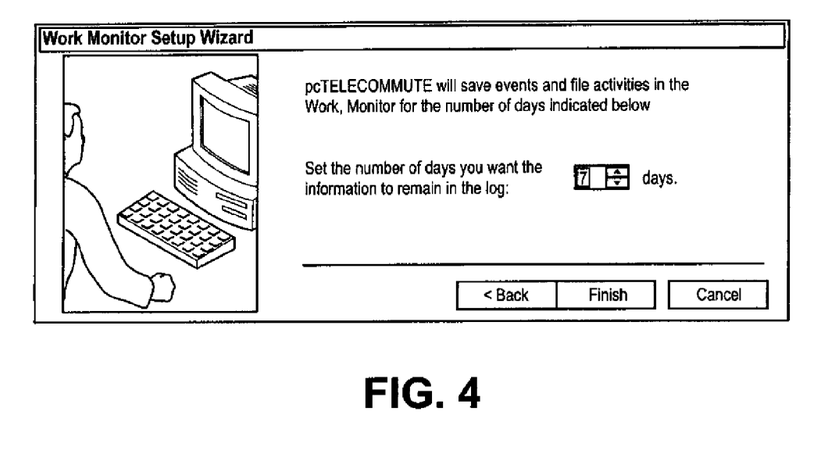
FIG. 4 illustrates the third panel of the Work Monitor Setup Wizard, in which the user selects the number of days that the user wants pcTELECOMMUTE to retain information in the log before automatically deleting it.

In the third panel of the Work Monitor Setup Wizard, the user selects the number of days that the user wants pcTELECOMMUTE to retain information in the log before automatically deleting it. FIG. 4 illustrates the third panel of the Work Monitor Setup Wizard, in which the user selects the number of days that the user wants pcTELECOMMUTE to retain information in the log before automatically deleting it.

The Work Monitor can keep entries in its log for up to 30 days before deleting them. For example, if the user wants to keep entries in the log for a week, use the default value of 7. Entries that are older than 7 days are deleted automatically from the log.

Looking at the pcTELECOMMUTE Windows

PcTELECOMMUTE uses three windows to display the user's information in convenient lists. These windows are the Contact List, Inbox, and Work Monitor.

Closing pcTELECOMMUTE

When the user no longer needs to use pcTELECOMMUTE, the user can close it. At the end of his workday at home, the user should close pcTELECOMMUTE so that it can notify the user of files that the user changed on his home PC, but have not yet synchronized with files on his office PC. If the user modified a file on his home PC, but has not synchronized it with his office PC, pcTELECOMMUTE displays the DayEnd Sync dialog box.

Figure 5:
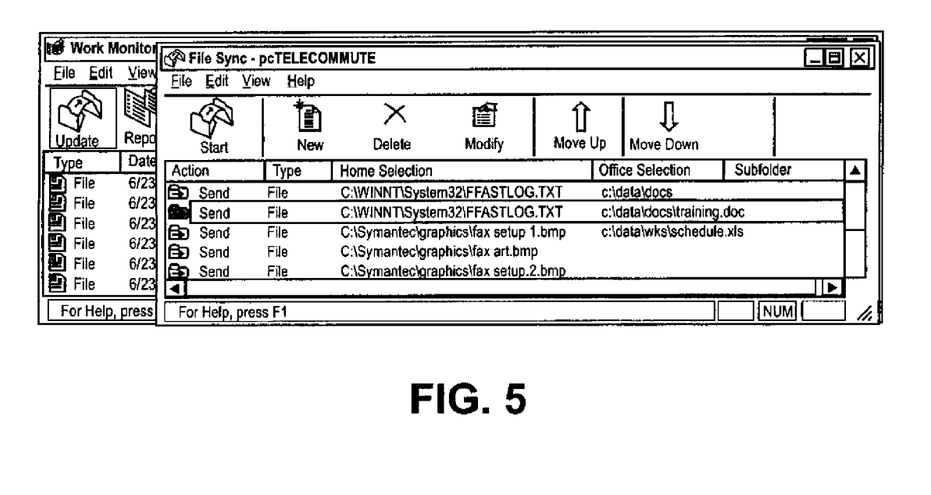
FIG. 5 illustrates a File Sync window according to the present invention.

If the user wants to synchronize the files that the user modified, the user indicates this in the DayEnd Sync dialog box. PcTELECOMMUTE displays the File Sync window, which lists the files that should be synchronized. FIG. 5 illustrates a File Sync window according to the present invention.

To close pcTELECOMMUTE completely, the user must close the Telecommute Control Center and all open pcTELECOMMUTE windows. Closing the Telecommute Control Center turns off the Work Monitor.

The Work Monitor can keep track of all his phone and fax activities and include them in a status report. Regardless of how the user makes a call, the Work Monitor can record the call information, including its duration, and enter it in the Work Monitor log.

Connecting to his Office PC

When the user connects to his office PC, the user begins what is referred to as a remote control session because the user controls the activities on his office PC remotely from his home PC. The remote control session lasts until the user disconnects from his office PC. Ending a remote control session disconnects his home PC from his office PC.

If the user does not want his office PC to wait for another connection for a remote control session, clear the Host Accepts Another Call option. In general, the user should leave this option set, so that the user can connect to his office PC again for another remote control session. If the user clears this option, the user cannot connect to his office PC for another remote control session, although the user can still perform file transfers using File Sync.

One essential function of successful telecommuting is maintaining the files on his home and office PCs so that they are always up-to-date. If the user creates a file on his office PC and modifies it at home, the user needs to be sure that the changes the user makes are also made in the file on his office PC.

The user can use pcTELECOMMUTE File Sync to quickly send and receive files and to synchronize files between his home and office PCs. In addition, the user can perform many file maintenance tasks, such as copying, renaming, and deleting files and folders using pcTELECOMMUTE File Transfer.

Regardless of the method the user uses to maintain his files, the Work Monitor can keep track of the file activities the user performs so that files the user modifies or accesses on his home PC are synchronized with those on his office PC.

Both pcTELECOMMUTE File Sync and pcTELECOMMUTE File Transfer allow the user to send files to and receive files from his office PC. Each offers the user different advantages, however. Using File Sync, the user can synchronize files on his home and office PCs so that they each contain the most recent copies of files. The user specifies the files the user wants to transfer in an easy-to-use wizard. File Sync maintains a list of file transfers the user specifies so that the user can perform them again and again. If the user is working on a document both at home and in the office over a period of time, File Sync can be used to synchronize the document on both his PCs. The File Sync Wizard is an efficient way to ensure that his files are up-to-date. If the user wants to synchronize files or folders, so that they are identical on his home and office PCs, the user must use File Sync.

The user can also use File Transfer to send and receive files. Because File Transfer displays the files on both his PCs as lists, the user may find it easier to locate and select the files or folders the user wants to transfer. However, File Transfer does not maintain a list of the file transfers the user has performed. If the user wants to perform other maintenance functions, such as copying or deleting files, the user should use File Transfer.

Using File Sync pcTELECOMMUTE's File Sync allows the user to keep information up to date with his most recent version of files when he works from home. With pcTELECOMMUTE's File Sync the user can synchronize individual files, entire folders or sub-folders on both the home and office PCs. The user can use File Sync to send files to, receive files from, and synchronize files with his office PC or network. When the user sends a file, pcTELECOMMUTE copies the file or folder from his home PC to his office PC or network. If the folder does not exist on his office PC, pcTELECOMMUTE creates it. If a file or folder with the same name and location exists on his office PC, pcTELECOMMUTE can prompt the user before overwriting the file.

When the user receives a file or folder from his office PC, pcTELECOMMUTE copies the file or folder from his office PC to his home PC. When the user synchronizes files, pcTELECOMMUTE copies the file from his office or home PC, depending on which is newer. pcTELECOMMUTE compares the date and time of both files and overwrites the older file with the newer file.

When the user synchronizes folders, pcTELECOMMUTE makes sure that both folders contain the same files. For example, if a file exists in the folder on his home PC, but not on his office PC, pcTELECOMMUTE copies the file to the folder on his office PC. If two files have identical names in the folders, pcTELECOMMUTE copies the newer file, overwriting the older file.

Setting Up his Home PC for File Sync

The user can set up pcTELECOMMUTE on his home PC so that it sends files to a default folder on his office PC, warns the user before overwriting a file, and checks for viruses during a file transfer. If the user sets up his home PC for file transfers when the user installed pcTELECOMMUTE, the user does not have to set it up again unless the user wants to change any options the user specified. If the user did not set it up for file transfers during installation or the user needs to change the setup information, the user can use the File Sync Setup Wizard.

Looking at the File Sync Window

The File Sync window maintains a list of files to be sent to, received from, or synchronized with files on his office PC. Each entry in the File Sync window is actually a command, which shows the type of transfer (Send, Receive, or Sync), the name and path of the files or folders on his home PC and his office PC, and for folders, an indication if files in subfolders are to be transferred also.

If the user has already specified a file transfer using the File Sync Wizard, the command for that transfer appears in the window. (The files are not transferred until the user clicks the Start button in the File Sync window.) The user can add additional commands for transfers and perform them directly from this window.

Creating his First File Transfer Command

Generally, the user adds file transfer commands to the File Sync window by clicking the File Sync button on the Telecommute Control Center. The first time the user clicks the File Sync button, the File Sync Wizard appears to help the user create the command. After the user has added his first file transfer command, each time the user clicks the File Sync button, the File Sync window appears. The user can then add file transfer commands by clicking the New button in the window.

To create his first file transfer command, on the Telecommute Control Center, the user clicks the File Sync button. The File Sync Wizard appears. The user chooses one of the following from the Action list: Synchronize, Send, and Receive.

Synchronize Synchronize files or folders on his home and office PCs

Send Copy a file or folder from his home PC to his office PC

Receive Copy a file or folder from his office PC to his home PC

The user chooses one of the following from the Type list: File and Folder. If the user is sending, receiving, or synchronizing the contents of a folder, select the Include Subfolders option if the user wants to transfer all files in all subfolders.

The second panel of the File Sync Wizard appears. The user types the filename or folder name and full path of the file or folder on the home PC to be used in the transfer, or clicks the Browse button to locate the file or folder. If the user is specifying a synchronization, the filename must be the same on both the home and office PCs. The user can copy the file or folder name in the Home Selection field and paste it into the Office Selection field in the next wizard panel.

The third panel of the File Sync Wizard appears. If the user copied the name of the file or folder in the second panel of the wizard, right-click in the Office. Type the filename or folder name and full path in the Office Selection field. Alternatively, the user can click the Browse button to locate the file or folder on his office PC or his office network. If the user has not yet connected to his office PC, pcTELECOMMUTE asks if the user wants to connect now, the user should indicate that he should connect now. The Browse for Office Folder or Browse for Office File dialog box appears. The user then locates the folder or file and clicks Select. The third panel of the wizard reappears, displaying the name of the file or folder the user selected. The user clicks Finish. The File Sync window appears and displays the file transfer command.

Adding File Transfer Commands

After creating the first file transfer command, the user can add more commands to the File Sync window to specify additional files or folders the user wants to transfer or synchronize. To add a file transfer command in the File Sync window: In the File Sync window, the user clicks the New button or chooses New from the File menu. The first panel of the File Sync Wizard appears. The user follows the instructions in the panels. The user can quickly add a command to the File Sync window by dragging a file to the window. For example, the user can select the file in Windows Explorer and drag it to the File Sync window. pcTELECOMMUTE adds the filename and path to the File Sync window. If this is the first time the user has transferred the file, the user must modify the command to specify the file on the office PC. If the user drags the same file to the File Sync window again, pcTELECOMMUTE automatically enters the office PC filename that the user specified previously in the Office Selection column of the window.

To add a file transfer command by dragging a file, the user drags the file to the File Sync window. pcTELECOMMUTE adds the filename to the File Sync window. If this is the first time the user has transferred this file, the user must complete the command. If the user has transferred this file before, pcTELECOMMUTE enters the previous office PC filename in the Office Selection column. The user can modify the command, if necessary. The user then right-clicks the command and chooses Modify from the shortcut menu. The user enters or changes the file transfer information to complete the command.

If the user wants to add a file transfer command that is similar to an existing file transfer command, the user can duplicate the existing command. Then, in the File Sync Wizard, the user can change any part of the command. For example, if the user has added a command to send all files in the C:\JuneReports folder to his office PC and later want to send all files in the C:\JulyReports folder, the user can duplicate the command and, in the File Sync Wizard, edit the folder name. To add a file transfer command that is based on another command, the user selects the command in the File Sync window. From the Edit menu, the user chooses Duplicate. After the File Sync Wizard appears, the user makes any required changes in the File Sync Wizard.

Changing File Transfer Commands

After the user has added a file transfer command to the File Sync window, the user can change it using the File Sync Wizard. To change a file transfer command, in the File Sync window, the user does either of the following: Select the file transfer command that the user wants to change and click the Modify button in the toolbar, or double-click the file transfer command that the user wants to change. The first panel of the File Sync Wizard then appears.

The user may change the order of file transfer commands. File transfer commands are performed in the order in which they appear in the File Sync window. The user can change the order of commands in the window. The user might want to change the order of commands, for example, so that all commands that access the same drive on his office PC or on a network server appear together in the list.

To change the order of commands in the File Sync window, the user, in the File Sync window, selects the file transfer command that the user wants to move. The user then clicks the Move Up or Move Down Button in the toolbar.

Deleting File Transfer Commands

If the user finds that the user no longer needs a file transfer command, the user can permanently delete it from the File Sync window. Deleting a file transfer command from the File Sync window cannot be undone. If the user inadvertently deletes a command, the user must re-enter the file transfer information using the File Sync Wizard.

To delete one or more file transfer commands from the File Sync window, in the File Sync window, the user selects the commands that the user wants to delete. The user shift-clicks to select multiple commands that are adjacent in the list. The user ctrl-clicks to select multiple commands that are dispersed in the list. Then the user either clicks the Delete button in the toolbar, presses the delete key on the keyboard, or right-clicks and chooses Delete from the shortcut menu. At the confirmation message, the user clicks yes. The selected file transfer commands are deleted from the File Sync window.

Transferring the Files

Adding a file transfer command to the File Sync window does not actually transfer files; it simply shows a command that the user wants to perform at some time. The user performs the file transfers directly from the File Sync window.

To transfer files, in the File Sync window, the user clicks the Start button. If the user has not connected to his office computer, pcTELECOMMUTE asks if the user would like to connect now.

If the user selected the Verify Before Overwriting option in the File Sync Setup Wizard and a file on his home PC has the same name as one on his office PC, the user may overwrite the file, overwrite all files in the transfer, or not overwrite the file, in which case the file transfer is not performed for that file. The user may click Cancel to cancel all file transfers. If the user chose Yes or Yes To All, pcTELECOMMUTE transfers the file or files and displays the Transfer Progress dialog box.

If the user wants to disconnect from his office PC, the user selects Disconnect When Finished before the transfer is complete.

Maintaining Files with File Transfer

Using pcTELECOMMUTE File Transfer, the user can maintain the files on his home and office PCs from home. The user can transfer files between his home and office PCs as well as copy, rename, and delete files on either PC.

Keeping Track of The User's Home Workday

The pcTELECOMMUTE Work Monitor can keep track of the incoming and outgoing faxes and phone calls as well as files that the user accesses or modifies on his home PC. The Work Monitor log contains a list of his file, phone, and fax activities. From the work monitor icon, the user can view the log of the day's events, including files accessed, files modified, incoming and outgoing calls and faxes sent and received.

Figure 6:
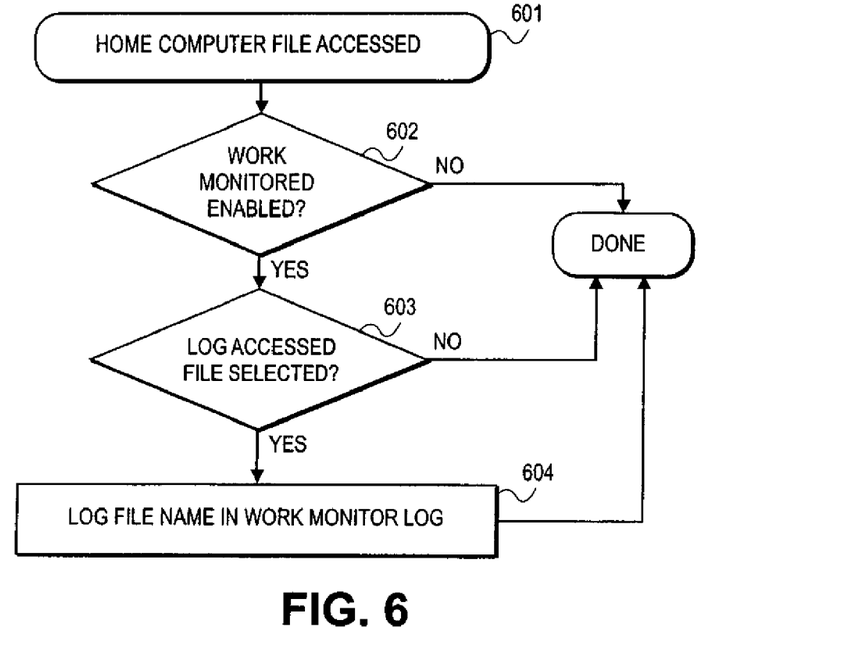
FIG. 6 illustrates a method according to the present invention of logging file names corresponding to file accesses on the home computer if the work monitor is enabled.
Figure 7:
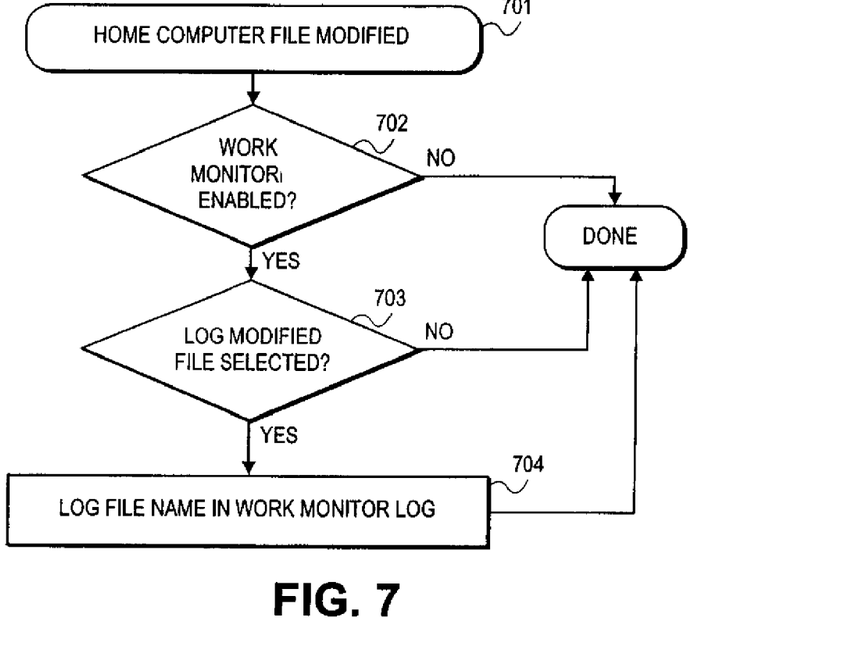
FIG. 7 illustrates a method according to the present invention of logging file names corresponding to computer file modifications on the home computer if the work monitor is enabled.

FIG. 6 illustrates a method according to the present invention of logging file names corresponding to file accesses on the home computer if the work monitor is enabled. Whenever the home computer determines that a file has been accessed, the method begins at step 601. If test 602 determines that the work monitor is enabled and if test 603 determines that the user has chosen to log files which are accessed, the filename corresponding to the accessed file is logged in the work monitor log at step 604. FIG. 7 illustrates a method according to the present invention of logging file names corresponding to computer file modifications on the home computer if the work monitor is enabled. Whenever the home computer determines that a file has been modified, the method begins at step 701. If test 702 determines that the work monitor is enabled and if test 703 determines that the user has chosen to log files which are modified, the filename corresponding to the modified file is logged in the work monitor log at step 704.

Figure 8:
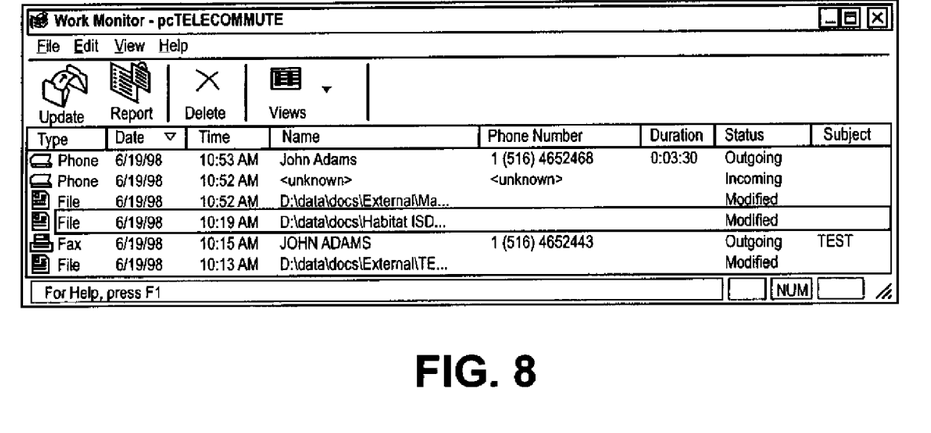
FIG. 8 illustrates the work monitor window according to the present invention.

The user can create a status report from the entries in the Work Monitor log. The user can update, or synchronize, the modified files directly from the Work Monitor window. FIG. 8 illustrates the work monitor window according to the present invention.

Setting Up the Work Monitor

If the user set up the Work Monitor when the user installed pcTELECOMMUTE on his home PC, the user does not need to set it up again unless the user wants to change any options the user selected. During the set up, the user specifies if the user wants the Work Monitor to track incoming and outgoing phone calls and faxes, the files the user wanted monitored, as well as the length of time that the user wants entries to remain in the Work Monitor. If the user did not set up the Work Monitor, or if the user wants to change the Work Monitor set up information, the user uses the Work Monitor Setup Wizard.

Turning the Work Monitor Off and On

When the user starts pcTELECOMMUTE, the Work Monitor is active and begins recording his activities. At times, however, the user may prefer to turn the Monitor off so that it does not record his activities. For example, if the user is ending his workday at home, but will continue to work on his PC for personal activities, the user turns off the Work Monitor. When the Work Monitor is active, a green dot appears on its button on the Telecommute Control Center. Selecting "Monitor" turns the Work Monitor on. A green dot displays above the Work Monitor icon on the Telecommute Control Center to alert the user that it has been activated.

Figure 9:
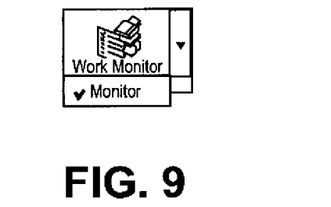
FIG. 9 illustrates the Work Monitor button on the Telecommute Control Center.

To turn the Work Monitor off or on, on the Telecommute Control Center, the user clicks the down arrow next to the Work Monitor button and chooses Monitor. The checkmark disappears. To turn the Work Monitor on again, the user click the down arrow and choose Monitor again. FIG. 9 illustrates the Work Monitor button on the Telecommute Control Center. Closing the Telecommute Control Center also turns off the Work Monitor.

Viewing the Work Monitor Log

All activities that the user selected for monitoring during Work Monitor setup are kept in the Work Monitor log. The user views the log in the Work Monitor window. To view the Work Monitor window, On the Telecommute Control Center, the user clicks on the Work Monitor button, and the Work Monitor window appears.

Deleting Entries from the Work Monitor

Figure 10:
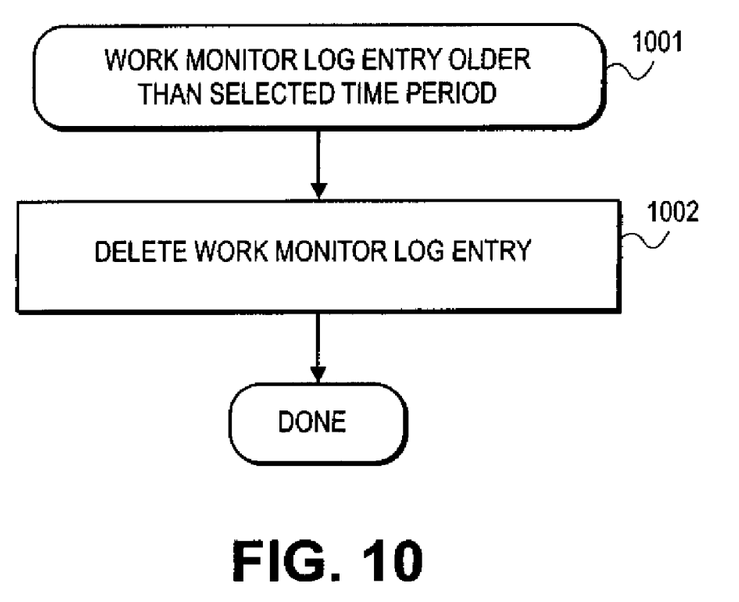
FIG. 10 illustrates a method according to the present invention of deleting any work monitor log entry which has been in the work monitor log for longer than the period specified by the user.

The Work Monitor automatically deletes entries that have been in its log for the length of time that the user set in the Work Monitor Setup Wizard. FIG. 10 illustrates a method according to the present invention of deleting any work monitor log entry which has been in the work monitor log for longer than the period specified by the user. If the home computer determines that any work monitor log entry is older than the user-selected time period, the method begins at step 1001. The home computer deletes the old work monitor log entry from the work monitor log at step 1002. The user can also delete any entries from the Work Monitor. For example, the user may want to delete personal phone calls from the Work Monitor before creating a status report.

To delete entries from the Work Monitor, in the Work Monitor window, the user may select multiple entries that are adjacent in the list (Shift-click), select multiple entries that are dispersed in the list (Ctrl-click), or select all entries in the Work Monitor window by choosing Select All from the File menu. Then the user may Click the Delete button in the toolbar, Press the Delete key on the keyboard, or Right-click and choose Delete from the shortcut menu. At the confirmation message, the user clicks yes. The selected entry or entries are permanently deleted from the Work Monitor.

Updating Files from the Work Monitor

Figure 11:
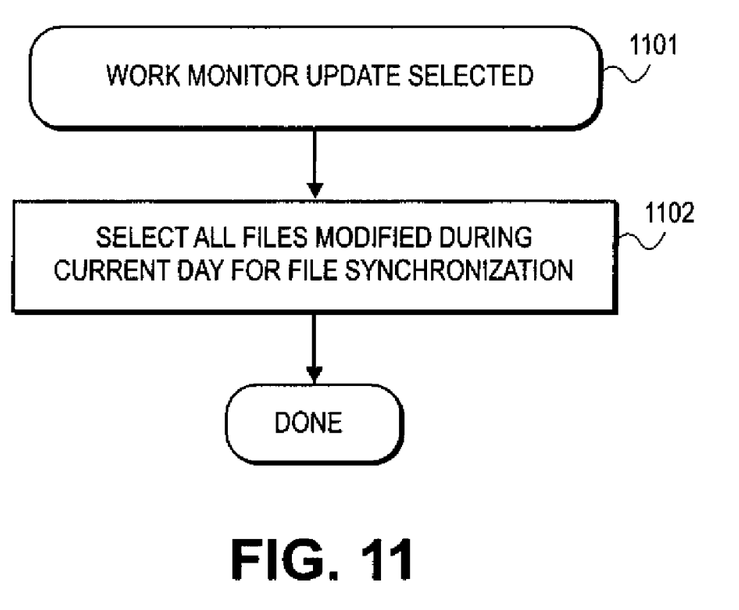
FIG. 11 illustrates the method of processing a work monitor update request according to the present invention.

If the user has modified a file on his home PC, but not synchronized it with a file on his office PC, the user can update it directly from the Work Monitor. To update a file from the Work Monitor, the user selects the file or files to be updated and clicks the Update button on the toolbar. When the user selects Update from the Work Monitor's toolbar, all the files he has modified throughout the day are selected for File Sync. FIG. 11 illustrates the method of processing a work monitor update request according to the present invention. When the user selects update from the work monitor at step 1101, all files that have been modified during the current day are selected for file synchronization at step 1102.

Figure 12:
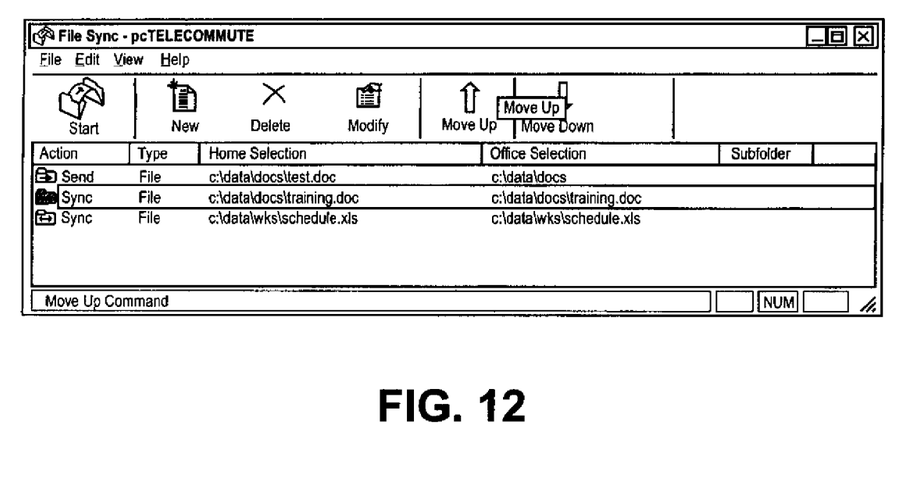
FIG. 12 illustrates the File Sync window used in the methods according to the present invention.

If the user has transferred this file before, the File Sync window appears with the file transfer command entered for this file. The Office Selection column shows the filename that the user specified the last time the user transferred this file. FIG. 12 illustrates the File Sync window used in the methods according to the present invention.

If the user has not transferred the file before, the Office Selection column is blank for this file. pcTELECOMMUTE displays a message informing the user that the user must specify a destination file or folder on his office PC. After clicking OK in the message dialog box, the File Sync Wizard appears so that the user can complete the file transfer command. In the third panel of the File Sync Wizard, the user types the filename and path of the file or folder on his office PC or clicks the Browse button to connect to his office PC so that the user can select a file. Then the File Sync window reappears. In the File Sync window, the user clicks the Start button on the toolbar to update the file.

Figure 13:
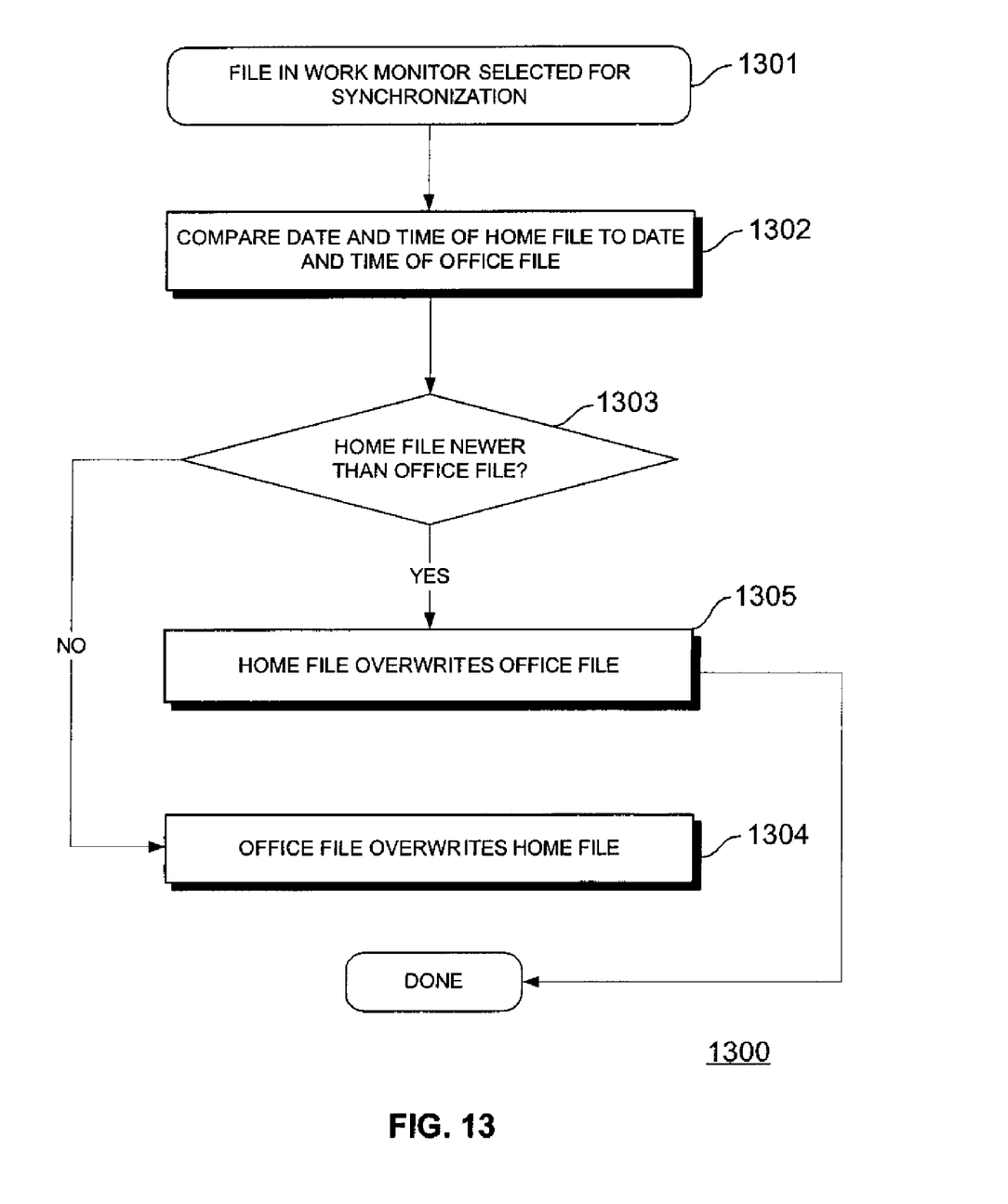
FIG. 13 illustrates the method of synchronizing the corresponding home and office computer files according to the present invention.

FIG. 13 illustrates the method 1300 of synchronizing the corresponding home and office computer files according to the present invention. The method 1300 is carried out for each file selected for synchronization in the work monitor. The method begins at step 1301 with the determination that a file in the work monitor is selected for synchronization. The home computer compares the date and time of the home file to the date and time of the corresponding office file at step 1302. If test 1303 determines that the home file is newer than the office file, then step 1304 overwrites the home file with the office file. If test 1303 determines that the home file is older than the office file, then step 1305 overwrites the office file with the home file.

Although the present invention has been described with respect to its preferred embodiment, that embodiment is offered by way of example, not by way of limitation. It is to be understood that various additions and modifications can be made without departing from the spirit and scope of the present invention. Accordingly, all such additions and modifications are deemed to lie with the spirit and scope of the present invention as set out in the appended claims.

What is claimed is:

1. A method for synchronizing a file type between a first personal computer at home and a second personal computer at office, comprising the steps of:

receiving a selection from a user on said first computer of at least one file type to monitor;

monitoring said first computer for modifications to files of said selected file type;

receiving an accumulation of modifications to the files of said selected file type on the first computer, said modifications received from a user performing work on the first computer;

recording a file identification responsive to each modification to a file of said selected file type into a work monitor log;

reading said work monitor log and for each file identification in said work monitor log, identifying on said second computer a corresponding file identification representative of said recorded file identification;

determining, for each file identification in the work monitor log, subsequent to said step of identifying and without user intervention, whether said modified file on said first computer is more recent than said identified file on said second computer; wherein said step of determining includes the steps of:

accessing a first date and time associated with said modified file;

accessing a second date and time associated with said identified file on said second computer; and, determining if said first date and time is more recent than said second date and time; and, automatically transferring said modified file to said second computer and automatically replacing said identified file on said second computer with said modified file on said first computer, only if it is determined that said modified file on said first computer is more recent than said identified file on said second computer.

2. The method of claim 1, wherein the step of replacing includes the step of:

replacing said modified file on said first computer with said identified file on said second computer, if it is determined that said modified file on said first computer is not more recent than said identified file on said second computer.

3. The method of claim 1, wherein said step of replacing said identified file on said second computer with said modified file on said first computer, replaces said identified file on said second computer with a copy of said modified file.

4. The method of claim 1 wherein said work monitor log keeps track of work the user does on the first computer, said work including at least one of: the files the user creates, modifies or accesses, calls the user makes and receives, and faxes the user sends and receives.

5. The method of claim 1 wherein the user specifies types of files and activities the user wants the work monitor log to monitor and how long the user wants the activities to remain in the work monitor log.

6. The method of claim 1 wherein the user selects a number of days to retain information in the work monitor log before automatically deleting said information.

7. The method of claim 1, further comprising:

notifying the user of files that were modified on said first computer but have not yet synchronized with files on said second computer.

8. The method of claim 1, further comprising:

printing a status report from said work monitor log, said status report including at least one of: file modifications, phone activities and fax activities of the user.

9. The method of claim 1 wherein said first computer is connected to said second computer via a remote connection in a remote control session.

10. The method of claim 1, further comprising:

disabling the work monitor log by said user such that the work monitor log does not record the user's activities for a period of time.

* * * * *